(12) United States Patent
Gossard et al.

(10) Patent No.: US 11,195,543 B2
(45) Date of Patent: Dec. 7, 2021

(54) SYSTEMS, DEVICES, AND METHODS FOR SYNCHRONIZING AUDIO

(71) Applicant: Clear Peaks LLC, Nashville, TN (US)

(72) Inventors: Stone Gossard, Seattle, WA (US); Mike Bundlie, Sherman Oaks, CA (US); Vladimir Tesanovic, Belgrade (RS); David R. Levine, Oxnard, CA (US)

(73) Assignee: Clear Peaks LLC, Nashville, TN (US)

( * ) Notice: Subject to any disclaimer, the term of this patent is extended or adjusted under 35 U.S.C. 154(b) by 0 days.

(21) Appl. No.: 16/362,220

(22) Filed: Mar. 22, 2019

(65) Prior Publication Data

US 2020/0302948 A1 Sep. 24, 2020

(51) Int. Cl.
*G10L 21/055* (2013.01)
*H04R 5/04* (2006.01)
(Continued)

(52) U.S. Cl.
CPC .......... *G10L 21/055* (2013.01); *H04L 65/601* (2013.01); *H04R 3/04* (2013.01); *H04R 5/04* (2013.01); *H04R 27/00* (2013.01)

(58) Field of Classification Search
CPC .............................. G10L 21/055; H04L 65/601
See application file for complete search history.

(56) References Cited

U.S. PATENT DOCUMENTS

| 5,668,884 A | * | 9/1997 | Clair, Jr. | .................. | H04R 5/00 381/79 |
| 8,938,078 B2 | * | 1/2015 | Meyer | .................... | H04R 27/00 381/82 |

(Continued)

FOREIGN PATENT DOCUMENTS

| CN | 109478400 A | 3/2019 |
| GB | 2566008 A | 3/2019 |

(Continued)

OTHER PUBLICATIONS

Mixhalo. Datasheet [online]. Mixhalo, 2019. [originally retrieved Jul. 24, 2019], Retrieved from the Internet: <URL:https://www.mixhalo.com/>.

(Continued)

*Primary Examiner* — Shaun Roberts
(74) *Attorney, Agent, or Firm* — Lee Sullivan Shea & Smith LLP

(57) ABSTRACT

Disclosed herein are new techniques carried out by a computing system for determining delays of various components of an audio system to allow for accurate correction of these delays, which may improve the audio quality of live performances for listeners who hear audio reproduced by loudspeakers at live performance venues. In one implementation the computing system, which may comprise a transmitter device and one or more receiver devices, may be configured to perform functions, including receiving a first audio signal, receiving, via an audio input interface of the receiver, a second audio signal, and determining, based on the first audio signal and the second audio signal, an audio delay that is associated with the second audio signal. The computing system may be configured to perform further functions, including based on a determined cross-correlation between a downsampled audio signal and a filtered second audio signal, determining the audio signal delay.

25 Claims, 4 Drawing Sheets

(51) Int. Cl.
*H04R 3/04* (2006.01)
*H04L 29/06* (2006.01)
*H04R 27/00* (2006.01)

(56) References Cited

U.S. PATENT DOCUMENTS

| | | | | |
|---|---|---|---|---|
| 9,942,675 B2* | 4/2018 | Tull | .................. | H04R 3/12 |
| 2003/0198257 A1* | 10/2003 | Sullivan | ................ | H04J 3/0682 |
| | | | | 370/516 |
| 2009/0164657 A1* | 6/2009 | Li | ..................... | H04L 65/80 |
| | | | | 709/233 |
| 2010/0271944 A1* | 10/2010 | Michaelis | ................ | H04L 65/80 |
| | | | | 370/230.1 |
| 2011/0195699 A1* | 8/2011 | Tadayon | ................ | H04M 3/53 |
| | | | | 455/418 |
| 2014/0328485 A1 | 11/2014 | Saulters | | |
| 2016/0323062 A1* | 11/2016 | Yang | ................ | H04L 47/34 |
| 2017/0142535 A1* | 5/2017 | Aggarwal | ........... | H04L 65/4092 |
| 2018/0329670 A1* | 11/2018 | Einziger | ............ | H04L 65/608 |

FOREIGN PATENT DOCUMENTS

| | | |
|---|---|---|
| JP | H 0653838 A | 2/1994 |
| JP | H 0876966 A | 3/1996 |
| KR | 10-2006-0005501 A | 1/2006 |
| WO | 2005/043511 A1 | 5/2005 |

OTHER PUBLICATIONS

Screen captures from YouTube video clip entitled "Mixhalo-powered Music," 2 pages, uploaded on Jul. 23, 2019 by user "Mixhalo". Retrieved from Internet: <http://www.youtube.com/watch?v=v2NJxv9czcU>.

Screen captures from YouTube video clip entitled "Mixhalo-powered Sports," 2 pages, uploaded on Jul. 23, 2019 by user "Mixhalo". Retrieved from Internet: <http://www.youtube.com/watch?v=TCuU2O90gwQ>.

Screen captures from YouTube video clip entitled "Mixhalo-powered Interpretation," 2 pages, uploaded on Jul. 23, 2019 by user "Mixhalo". Retrieved from Internet: <http://www.youtube.com/watch?v=R_I7Gq-mfdY>.

Screen captures from YouTube video clip entitled "Mixhalo-powered Conferences," 2 pages, uploaded on Jul. 23, 2019 by user "Mixhalo". Retrieved from Internet: <http://www.youtube.com/watch?v=ANgztJ73zsc>.

Screen captures from YouTube video clip entitled "Mixhalo-powered Public Events," 2 pages, uploaded on Jul. 23, 2019 by user "Mixhalo". Retrieved from Internet: <http://www.youtube.com/watch?v=5tENkfun8C4>.

PCT International Search Report and Written Opinion, PCT International Application No. PCT/US2020/021228, dated Jun. 11, 2020, 10 pages.

\* cited by examiner

SYSTEMS, DEVICES, AND METHODS FOR SYNCHRONIZING AUDIO

FIELD OF THE DISCLOSURE

The present disclosure relates generally to audio playback systems and more particularly to systems for audio playback and synchronizing audio.

BACKGROUND

Live music venues may have complex loudspeaker systems in which loudspeakers are often installed at various locations throughout the live music venue. Each of these loudspeakers may be responsible for playing back audio during a performance at the live music venue.

SUMMARY

I. Overview

Various embodiments will be described that provide various advantages for loudspeaker systems that are installed at various locations throughout a single site. It is appreciated that features of these various embodiments may be combined with each other in accordance with the desired system requirements. It should be understood that these embodiments may be combined with each other in various combinations.

A site, such as a performance venue, building, business, home theatre, etc., may have an audio system that comprises one or more loudspeakers that are installed at various locations throughout the site. At a high level, an audio system may be thought of as being made up of an audio source, which produces one or more channels of audio signals, and one or more loudspeakers, which convert the one or more channels of audio signals to soundwaves that may be audible to a listener.

An audio source may take various forms. For example, in the case that an audio system comprises a home theater configuration, an audio source may take a form such as a smartphone, streaming device, turntable, media player, computing device, etc. In the case that the system is a live performance venue, an audio source may be considered to be the one or more channels of sound waves, which may be generated by musical performers and/or their instruments that are converted to an electrical signal by transducing devices such as microphones, pickups, direct boxes and/or audio interfaces.

The electrical signals for each channel may be input to an audio processing device such as an audio mixer, audiovisual receiver, audio effects processor, etc. In some instances, the audio processing device may mix one or more channels of the captured audio together and/or add various effects to the audio signals and thereby produce one or more processed audio signals. After processing the electrical audio signals, the audio processing device may output the processed audio signals.

Typically, one or more amplifiers may receive audio signals, such as the processed audio signals as input, increase the power of the inputted signals and thereby generate an amplified audio signal that is capable of driving the acoustic transducers such as loudspeakers. In turn, the transducer or loudspeaker converts an amplified audio signal to audible soundwaves.

The audio source may be coupled to the amplified loudspeakers in various manners using various different communication mediums. As one example, the loudspeakers may most commonly be coupled to an audio source with a hardwired cable. As another example, the amplified loudspeakers may be coupled to the audio source wirelessly using any of various wireless communication protocols such as any of the IEEE (Institute of Electrical and Electronics Engineers) 802.11x suite of protocols, as an example, or any other wireless communication protocol.

In any case, the various components of an audio system may introduce various delays that may result in a number of undesirable behaviors. As a first example, an audio processing device, such as a mixing board, may introduce a delay between the time that the audio processing device receives an input audio signal and the time that the audio processing device outputs a processed audio signal. Various types of audio components introduce various amounts of delay. Audio components implementing analog-to-digital signal conversion and digital-to-analog signal conversion tend to introduce significant delay times.

As a second example, there may be also delay associated with a given loudspeaker between the time that the transducer of a given loudspeaker converts an amplified electrical signal to produce soundwaves and the time that the soundwaves reach a listener who hears the soundwaves produced by that given loudspeaker. This second type of delay may also be a function of the distance traveled by the soundwaves before the soundwaves reach a listener's ear. The propagation delay of a soundwave may generally be proportional to the speed of sound, which may be significantly slower than the propagation speed of an electromagnetic signal.

As yet another example, an audio system of a performance venue may comprise multiple sets or "banks" of loudspeakers that are installed at different locations so that listeners at each of those locations can hear a live performance with good acoustics regardless of how far away the listeners are from the performers. Since the audio from the sound source travels at nearly the speed of light to the all of the audio "banks" or delay clusters, each loudspeaker consequently may reproduce the audio source at the same time regardless of how far away each cluster of speakers is from a given listener.

The loudspeakers located further away from the performers receive an audio signal from the audio source and generate sound waves at the same time as the loudspeakers that are located closer to the performers and farther from the listener. Additionally, because listeners at the performance venue may be positioned at different distances away from each speaker bank, the soundwaves may arrive to the listener from each bank with earlier or later than the sound arrives from other banks. The differing times at which the sound of each loudspeaker arrives to the listener may result in the listener hearing a sort of echo or "doubling" effect in which a user hears multiple instances of a same sound at differing times. Conversely, in order to offer the listener clear sound, it is often necessary to introduce a delay to various loudspeakers that are located further away from the primary audio source such that the loudspeakers that are further away "wait" for the acoustic sound from the primary sound source to arrive before reproducing the same sound signal from the primary audio source.

During setup of the speaker system, a technician may attempt to determine and correct for delays such as signal propagation delays and loudspeaker delays by standing at a listening position at some distance in front of each loudspeaker or loudspeaker cluster, attempting to determine the amount of delay needed to align each loudspeaker with the primary acoustic audio source, and finally programming an audio component, such as a mixer, amplifier, etc., to correct for the determined delay needed to align that loudspeaker. However, the determined delay may be inaccurate, and/or may only be valid for listeners standing at the exact same position as the technician. If a listener is closer, further away, or offset in some direct (e.g., to the left or right) of the loudspeaker, the listener may experience a different loudspeaker delay than the delay determined and corrected by the technician.

In addition to perceiving the effects of loudspeaker delays, the audio heard by listeners may be impacted by various other factors. For instance, the atmosphere may impair the propagation of certain audible frequencies through the air. More specifically, the atmosphere may impair propagation of higher audible sound frequencies through the air while lower audible sound frequencies may be less impaired by the atmosphere. As a result of the atmosphere impairing higher audible sound frequencies, higher frequency sounds may be less pronounced while lower sound frequencies may be more pronounced to a listener who is relatively far away from a venue's loudspeakers. The more pronounced low audible frequencies and less pronounced high audible frequencies reduces the intelligibility of the sound and may be unpleasant for the listener to hear. Other significant factors causing audio degradation for listeners located at a significant distance from an audio source are acoustic reflections and reverberation. Sound reflects off of any and all surfaces and the greater the distance the listener is from the acoustic source, the more detrimental these issues may become.

At a high level, the techniques of this disclosure are directed to a computing system comprising a transmitter device and one or more receiver devices, each of which may comprise a respective computing device. The computing system comprising the transmitter device and the one or more receiver devices may be configured to perform functions of: 1) detecting and determining delays of various components of an audio system to allow for accurate correction of these delays, and 2) improving the audio quality of live performances for listeners who hear audio reproduced by loudspeakers at live performance venues. The computing system of this disclosure may take various forms and may perform these functions in various manners.

The transmitter device and the receiver device may each take the form of computing devices that may comprise one or more application-specific integrated circuits (ASICs), field programmable gate arrays (FPGAs), central processing units (CPUs), and/or digital signal processors (DSPs), etc. As an example, the transmitter device may comprise a laptop, desktop, tablet, etc., that may be connected to a component of the audio system. The receiver device may generally be a portable computing device and may take the form of a wearable computing device in some instances.

At a high level, the receiver device may be configured to receive the first audio signal and a second audio signal. Based on the first audio signal and the second audio signal, the receiver device may determine a delay between the second audio signal and the first audio signal, wherein the delay is associated with the second audio signal. The receiver device may be configured to receive the first audio signal and the second audio signal in various manners, and the first and second audio signals may take various forms.

In general, there may be one or more receiver devices that rely on the transmitter device in some manner. As an example, a receiver device may rely on the transmitter device in some manner to synchronize and/or generate one or more of the first audio signal or the second audio signal based on which the receiver device determines a delay of the audio system. According to an implementation, the transmitter device may be synchronized with the receiver device in some manner. As one example, the transmitter device and the receiver device may be capable of synchronizing clock signals (referred to as "clocks") with each other for a period of time (e.g., hours, days, etc.). After synchronizing their respective clocks, the transmitter device and the receiver device may both simultaneously play back identical audio that forms the first audio signal. This first audio signal may be referenced internally by the receiver and may be played back through the sound system by the transmitter device. As an example, the transmitter device and the receiver device may both be configured to play back audio of media items from an identical playback queue (e.g., a playlist stored locally or in the cloud) in synchrony with each other according to the respective synchronized clocks. As another example, the transmitter device and the receiver device may both play back a series of audible and/or internal pulses at regular intervals in synchrony based on the respective synchronized clocks.

According to this implementation, the transmitter device may be coupled to one or more audio components of the audio system, such as a mixer, amplifier, etc. The transmitter device may output an electrical signal representation of the audio being played back via an audio input interface such as an RCA, XLR, minijack, etc. The transmitter device may output an electrical signal representation of the audio in various other manners as well.

One or more audio components of the audio system may receive and process the audio signal from the transmitter device. Each of these components may in turn output a processed version of the initial audio signal to another audio component of the audio system, and so on, until eventually and after some delay, one or more loudspeakers receive the signal and convert the signal to audible soundwaves.

According to some examples, the receiver device may be configured to receive, via an audio input interface, the processed audio signal that was originally generated by the transmitter device and finally output by an audio component or the audible soundwave representation of the signal output by the transmitter device. According to some other examples, the receiver device may be configured to receive, via an audio input interface, the soundwaves output by the one or more loudspeakers that correspond to the signal that was output by the transmitter device to the components of the audio system. In any case, the signal captured by the audio input interface forms the second audio signal for which the receiver device is to calculate the differential delay between the first and second signals. The receiver device may be configured to receive the second audio signal in various manners.

According to some example, the receiver device may be configured to receive the second signal via an audio input of the receiver device, such as a microphone input or a line level input (such as an XLR input). In some instances, the receiver device may comprise or may be connected to a microphone via the microphone interface. In instances which the receiver device is coupled to a microphone, the microphone may convert audible soundwaves to an electrical signal that forms the second audio signal. In this manner, the receiver may be configured to capture audible soundwaves from one or more loudspeakers that form the second audio signal using the microphone interface. In other instances, the receiver device may be connected via one or more audio components such as a mixing board, amplifier, effects processor, etc., to the transmitter device via a line level input of the receiver device.

Both the microphone and level audio input interfaces that the receiver device uses to receive the second audio signal may generally be analog audio input interfaces. For easier signal processing, after receiving the second audio signal in an analog format, the receiver device may convert any audio signals received in an analog format to a digital format. The receiver device may employ an analog-to-digital conversion such as Inter-IC Sound ($I^2S$) to convert the analog audio signal to a digital audio signal. The digital audio signal may take various forms such as a pulse channel modulation (PCM) format. The receiver device may perform the functions of converting the analog audio signal to a digital audio signal in various other manners as well.

In the above-described manners, the receiver device may receive the second audio signal from the transmitter device via line level electrical input of the receiver device.

According to another implementation, the transmitter device may wirelessly transmit the first audio signal to the receiver device, and the receiver device may receive the first audio signal from the transmitter device via a wireless interface. The functions of wirelessly transmitting and receiving the first audio signal may take various forms.

According to one example, the transmitter device may be configured to convert the audio signal to a format that is suitable for digital wireless transmission. As an example, the transmitter device may convert the audio signal received from the audio source to an audio format that is suitable for digital wireless transmissions that may comprise a digital audio format. Examples of such digital audio formats may comprise lossy digital audio formats such as MP3, OPUS, OGG Vorbis, Advanced Audio Codec (AAC) or any other digital audio format. The digital audio format suitable for wireless transmission may take various other forms as well.

It may generally be desirable to minimize the amount of time (i.e., the latency) that the transmitter device spends encoding the received audio signal. In order to minimize the encoding time, it may be desirable to utilize an audio codec that provides low encoding latency. One example of such a low encoding latency codec is the OPUS codec. However, it should be understood that other audio codecs may provide suitably low latency as well.

The transmitter device may encode the received audio signal in the digital audio format using various audio encoding parameters. As an example of such parameters, the transmitter device may encode the received audio signal with a given bitrate and at a given sampling frequency. According to some implementations, the transmitter device may encode the audio signal received from the audio source with a 128 kilobyte per second bitrate and a 48 kHz sampling rate. The transmitter device may encode the audio signal received from the audio source using various other encoding parameters as well.

In some implementations, the transmitter device may be configured to reduce the complexity of the received audio signal before encoding the received audio signal. The functions of reducing the complexity of the received audio signal may take various forms. As one example, the transmitter device may be configured to remove a certain audible frequency spectrum, such as the low audible frequency spectrum, of the received audio signal. Removing the low frequency audible spectrum of the received audio signal may serve various purposes. First, any removing of the audible frequency range may reduce the size of the encoded version of that audio signal. Second, removing a given audible frequency range may reduce piracy of the encoded audio signal in that even if an eavesdropper were to capture the encoded version of the audio signal, the eavesdropper would not be able to capture the full audible spectrum of the audio signal due to captured signal having an audible portion removed.

Finally, after encoding the audio to a digital format, the transmitter device may encapsulate the encoded audio data into one or more datagrams and transmit the datagrams via an antenna to the receiver device. The functions of the transmitter device encapsulating the encoded audio into datagrams may take various forms.

As some examples, the transmitter device may convert the encoded audio into datagrams of a networking protocol that is suitable for wireless transmission. Examples of such wireless-compatible protocols may comprise: Wi-Fi protocols (i.e. the IEEE 802.11x suite of protocols), so-called "white space" protocols that operate on available frequency spectrum, ZIGBEE, WI-MAX, Z-WAVE, Internet of Things (IoT) communication protocols, protocols that utilize Industrial Scientific, Medicine (ISM) frequency bands or any other type of digital wireless communication protocol. The wireless protocols may take various other forms as well.

As part of formatting the encoded audio into datagrams, the transmitter device may also encrypt the datagrams used for wireless communications of a given wireless protocol. The transmitter device may encrypt the wireless communications in various manners. As one example, the transmitter device may use a symmetric encryption algorithm such as AES, an asymmetric key algorithm, such as the RSA or Diffie-Hellman algorithms, or a combination thereof. The transmitter device may encrypt the wireless communications in various other manners as well.

The receiver device may include a radio frequency (RF) antenna that is capable of receiving the encoded wireless signal from the transmitter device. While the transmitter is transmitting encoded audio and the receiver device is powered on, the receiver device may be configured to receive and decode the encoded audio signal received from the transmitter device via the RF antenna of the receiver device.

The receiver device may receive signals modulated on various frequencies via the RF antenna. Upon initialization of the receiver device, the receiver device may be configured to establish a connection with a transmitter device. The process of establishing a connection with the transmitter device may take various forms. According to one implementation, the receiver device may be configured to establish a connection with the transmitter device by negotiation connection parameters with the transmitter device. According to another implementation, the receiver device may be pre-configured with the parameters necessary to communicate with the transmitter device. Examples of such parameters may include a frequency band (such as a channel) used to communicate with the transmitter device, encryption parameters, such as a pre-shared key, public key of the transmitter, etc. The connection parameters and the process of connecting with the transmitter device may take various other forms as well.

The receiver device may decode the first audio signal received from the transmitter device in a process that is generally inverse to the encoding process described with respect to the transmitter device. More particularly, the receiver device may receive a sequence of datagrams that represent an encoded version of the first audio signal. The datagrams may arrive out of order in some cases. If any of the datagrams arrive out of order, the receiver device may reorder the datagrams into their correct order and may assemble the datagrams into chunks of data that form a stream of encoded audio that correspond to the first audio signal. After re-assembling the chunks of data that form the stream of encoded audio data, the receiver device may decode the stream of encoded audio data by inversely transforming the encoded audio data and thereby convert the encoded audio data from the encoded format, (e.g., the OPUS format or another audio format) to an uncompressed format, such as a 48 kHz, Pulse Channel Modulation (PCM) 16 format. The above-described techniques are but one example of a manner in which the transmitter device and receiver device may wirelessly communicate the first audio signal. The transmitter device and receiver device may wirelessly communicate the first audio signal in various other manners as well.

Regardless of the manner the receiver device receives the first and second audio signals, the receiver device may then determine a differential delay associated with the second audio signal relative to the first audio signal. The function of the receiver determining a delay associated with the second audio signal may take various forms.

According to some implementations, the receiver device may be configured to output an indication of the determined delay between the second and first audio signals. Based on the outputted delay between the second and first audio signals, a user of the receiver device may be able to utilize the delay determined by the receiver device to configure various components of an audio system to account for the determined delay.

As described above, the receiver device may receive a first audio signal wirelessly, by playing back audio in synchrony with a transmitter device. In either case, in the first audio signal may be in an uncompressed format, such a PCM format. In response to receiving the first audio signal, the receiver device may store the uncompressed audio of the first signal in a buffer, which is referred to herein as a "Radio Frequency (RF) buffer." The RF buffer may be implemented in software and/or hardware and may store a fixed duration of audio, for instance storing three seconds of audio, as an example. The RF buffer may take various other forms and may be various other sizes as well.

After storing the audio in the buffer, the receiver device may be configured to downsample the frequency of the audio stored in the RF buffer. Downsampling the frequency of the audio stored in the audio buffer may: (1) reduce the amount of signal processing, and (2) filter high frequency noise. According to an example implementation, the receiver device may be configured to downsample the buffered audio by $\frac{1}{6}^{th}$ and thereby produce downsampled audio at an 8 kHz sampling rate and in a PCM16 audio format. The receiver device may utilize various other downsampling functions as well or may not perform downsampling according to various other implementations as well. After downsampling the buffered audio, the receiver device may input the downsampled audio into a correlation filter as will be described in greater detail.

While the receiver device receives and stores the first audio in the RF buffer, the receiver device may receive the second audio signal. In some cases, the second audio signal may be received in an analog format rather than a digital format. In these cases, the receiver device converts analog audio captured by the microphone into a digital format. The receiver device may convert the captured analog audio into a digital format using an analog-to-digital conversion process. According to a preferred implementation, the receiver device may employ an analog-to-digital conversion such as $I^2S$ to convert the analog audio signal to a digital audio signal. The receiver device may convert the analog signal to a digital audio signal in various other manners as well.

After optionally converting the second audio signal from analog to digital, the receiver device may remove the same range of audible frequencies that were removed from the first audio signal. As an example, if the first audio signal has low audible frequencies removed, the receiver device may remove low audible frequencies from the digital representation of the second audio signal, for instance using a low-pass filter. The receiver device may remove certain ranges of audible frequencies from the first and/or second audio signals in various other manners as well.

After filtering the second audio signal, the receiver device may store the filtered second audio signal. According to an implementation, the receiver device may store the filtered second audio signal in a second buffer which may be referred to herein as a "microphone buffer." The microphone buffer may be implemented in software and/or hardware and may be capable of storing various amounts of audio, for instance, three seconds of audio, according to one example. The microphone buffer may take various other forms and may be various other sizes as well.

After the receiver device stores a portion of the first audio signal in the RF buffer and a portion of the second audio signal in the microphone buffer, the receiver device may input some audio stored in the RF and microphone buffers into one or more filters that may determine and optionally correct for a delay between the first audio signal stored in the RF buffer and the second audio signal stored in the mic buffer. The receiver device may determine the delay associated with the second audio signal relative to the first audio signal in various manners.

According to an implementation, a receiver device may utilize one or more filters to determine the delay between the portion of the first audio signal and the portion of the second audio signal stored in the RF and microphone buffers, respectively. According to some examples, the one or more filters may comprise a cross-correlation audio delay estimator, which may determine the time delay between the audio stored in the microphone buffer and a downsampled version of the audio stored in the RF audio buffer. At a high level, the cross-correlation filter calculates the time delay between two different signals A (which may correspond to the downsampled version of the audio stored in the RF buffer) and B (which may correspond to the audio stored in the microphone buffer) by calculating the convolution of the first signal A with the inverse of the second signal B. The receiver device may determine the delay between the stored portions of the first audio signal and the second audio signal in various other manners. After determining a delay between the stored portions of the first audio signal and the second audio signal, the receiver device may perform various functions based on the determined delay.

A. Delay Output

According to one implementation, the receiver device may be configured to output an indication of the determined delay. Afterwards, a user of the receiver device may then utilize the indication of the outputted the delay in various manners.

According to some implementations, a user of the receiver device may issue an input that may trigger the receiver device to store portions of the first and second audio signals in the RF and microphone buffers, determine a delay between the second and first audio signals, and output the determined time. The user input and the output of the receiver device may take various forms.

According to some implementations, the receiver device may comprise one or more physical buttons. According to other implementations, the receiver device may display a user interface comprising one or more virtual buttons. In any case, a user of the receiver device may press or select one of the buttons to trigger the receiver device to capture (i.e., store) portions of the first and/or second audio signals in the RF and microphone buffers and determine the delay between the captured portions of the first and second audio signals.

In some cases, after receiving the selection of a button that triggers the receiver device to determine the delay, the receiver device may output (e.g., display) the determined delay that is based on the signal received from the transmitter device and the audio captured from the environment using the microphone of the receiver device. The function of outputting the determined delay at the display may take various forms.

The display of the delay may take various forms. According to one example, the receiver device may display a representation of a calculated delay in units of time such as seconds, milliseconds, microseconds, etc. According to another example, the receiver device may be configured to convert the calculated delay from seconds to units of distance (e.g., meters, feet, etc.) that represent the distance travelled by sound over the time of the delay. For instance, if a calculated delay is 100 milliseconds, the receiver device may calculate the distance traveled by sound over the 100 milliseconds (equal to 0.1 seconds) by multiplying the speed of sound in air (343 meters/second) by 0.1 seconds to determine that the sound traveled 34.3 meters. In turn, the receiver device may display the calculated distance. A user may then use the calculated distance to determine the distance from the user's location to a given loudspeaker or cluster of loudspeakers. The receiver device may output the determined delay in various other manners as well.

After the receiver device outputs a delay a user may, in turn, utilize the determined delay that the receiver devices outputs in various manners.

According to one example, a user may utilize the receiver device to determine a processing delay of a component, such as a mixer or another audio processing component. According to this example, the transmitter device may be connected to, and may output an audio signal to an input of the audio processing device, and an audio input of the receiver device may be connected to an output of the audio processing device. To determine a delay associated with the connected processing component, the user may select a button to trigger the receiver device to determine a delay associated with the audio signal received from the audio processing component and finally output the determined delay. Based on the delay output by the receiver device, the user may determine whether the delay is within an acceptable range and may make adjustments to the audio system to reduce the processing delay if the determined processing delay is outside the acceptable range.

As one example, the user may use the receiver device to determine respective delays at a given listening position for each loudspeaker in a home theater speaker system. A user may utilize the respective delays for each speaker. In turn, based on the delay outputted by the receiver device, the user may then calibrate the loudspeakers such that each of the loudspeakers has a same delay. By calibrating each loudspeaker to have the same delay, the audio fidelity of such a home theatre speaker system may be improved such that sound waves produced by each speaker arrive at a listener's ears at the same time.

As another example, a user may utilize the delay outputted by the receiver device to align a loudspeaker system of a performance venue which may comprise clusters of loudspeakers that are positioned at different locations throughout the performance venue, and each of which may have a different associated delay. To determine the delay for each cluster of loudspeakers and align the delay of those clusters to the primary audio source, a user of the receiver device may stand at a listening position in front of each cluster and may trigger the receiver device to determine the time necessary for sound to travel from the primary sound source to that listening position based on the audio received via the microphone of the receiver device. Subsequently, the user would trigger the receiver device to take a second measurement of the sound radiated by the delay cluster, and to calculate the difference between the first and second measurements. The difference between these two measurements is the delay time that should be added to the delay cluster such that the sound from the primary sound source and cluster arrive at that listening position simultaneously.

According to yet further examples of the delay and output implementations, the receiver device may be configured to store two (or more) delays and to determine and output (e.g., display) the difference between the two stored delays. A user of the receiver device may use the difference of the two delays to calibrate and correct for the delay associated with one or more speakers such as a cluster of loudspeakers that is closer to a listening position of the user relative to the primary audio source that is further away from the listening position of the user.

As a more particular example, a user may position him or herself at a listening position that is a given distance in front of a first delay cluster of loudspeakers for which a delay needs to be calculated relative to the primary audio source that is located further away from the listener than the delay cluster. After positioning him or herself in front of the delay cluster, the user may first press a button on the receiver device to trigger the receiver device to determine a first measurement comprising a first delay that is associated with the primary audio source. The user may then turn off the primary audio source and turn on the delay cluster. After turning on the delay cluster, the user may press the button on the receiver device to trigger the receiver device to determine a second measurement comprising a second delay that is associated with the primary audio source. Finally, the user may press the button on the receiver device again to trigger the receiver device to calculate and store the difference between the first measurement that is associated with the primary audio source, and the second measurement that is associated with the delay cluster.

Finally, the user may configure one or more audio components of an audio system to compensate for the determined difference between the first and second delays. For instance, the user may configure an audio component to add the calculated time offset difference to the delay cluster of loudspeakers. The user may utilize the difference between the first and second delays in various other manners as well.

B. Audio Output

According to some implementations, after the receiver device determines the delay between the first and second audio signals, the receiver device may also output the first audio signal based on the determined delay. The functions of outputting the first audio signal based on to the determined delay may take various forms.

According to some examples, the receiver device may first attempt to correct for the delay using one or more filters that may also take various forms. According to some examples, the one or more filters may comprise a delay correction filter. The delay correction filter may correct for the determined delay by applying the determined delay to the output of the audio data stored in the RF buffer, thereby delaying output of the audio stored in the RF buffer by the determined delay.

After delaying the output of the audio stored in the RF buffer, the receiver device may output the digital audio stored in the RF buffer based on the determined delay. The functions of outputting the stored digital audio may generally involve a digital-to-analog conversion. The digital-to-analog process may generally be the reverse of the analog-to-digital conversion process that the receiver device performs when receiving and converting an analog signal to a digital signal. As with the analog-to-digital conversion that the receiver device performs, the receive device may be configured to use I2S to convert the digital audio signal, which may be in a PCM format, to a digital audio signal.

Finally, after converting the digital audio signal to an analog signal, the receiver device may output the audio signal at an audio output interface of the receiver device. The audio output interface may take various forms. As one example, the audio output interface may take the form of an ⅛" minijack, XLR connector, ¼" connector, etc., that may be connected to the receiver device. A user of the receiver device may listen to the audio output by the receiver device using a pair of headphones. The audio output by the receiver device may also be used in different contexts and for various purposes as well.

According to some examples, the receiver device may comprise a battery-powered wearable computing device. A user of the receiver device may wear the receiver device, for instance using a lanyard, clip, or another fastening system that allows the user to wear or have the receiver device on his or her person without having to hold the device in his or her hands. A user of the receiver device may wear the receiver device, for example at a performance venue during a live concert performance. While wearing the receiver device during the performance, the user may listen to the audio output by the receiver device through headphones to enhance the audio that the user hears from the loudspeakers at the performance venue.

Although the following discloses example methods, apparatus, systems, and articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

When any of the appended claims are read to cover a purely software and/or firmware implementation, at least one of the elements in at least one example is hereby expressly defined to include a tangible medium such as a memory card, DVD, CD, Blu-ray, etc., storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure may be practiced without certain, specific details. In other instances, well known methods, procedures, components, and circuitry have not been described in detail to avoid unnecessarily obscuring aspects of the embodiments.

Accordingly, in one aspect, disclosed herein is a computer-implemented method that involves (a) receiving a first audio signal, (b) receiving, via an audio input interface of a device, a second audio signal, and (c) determining, based on the first audio signal and the second audio signal, an audio delay that is associated with the second audio signal. In another aspect, the computer-implemented method further involves (d) decoding the first audio signal with a lossy audio decoder, (e) storing the first audio signal in a first buffer, (f) downsampling the first audio signal to produce a downsampled audio signal, (g) filtering the second audio signal to remove a range of audible frequencies of the second audio signal and thereby produce a filtered second audio signal, (h) storing the filtered second audio signal in a second buffer, (i) determining a cross-correlation between the downsampled audio signal and the filtered second audio signal, and (j) based on the cross-correlation, determining an audio delay that is associated with the second audio signal.

In another aspect, disclosed herein is a device that comprises an audio input interface, at least one processor, and a memory storing program instructions that are executable by the at least one processor to cause the device to carry out the operations disclosed herein, including but not limited to operations of the foregoing method.

In yet another aspect, disclosed herein is a computing system that comprises a transmitter device comprising (i) a first memory storing first program instructions, and (ii) a first at least one processor, and a receiver device comprising (a) a second memory storing second program instructions, and (b) a second at least one processor, where one or more of the first program instructions or the second program instructions are executable by one or more of the first at least one processor or the second at least one processor to cause one or more of the transmitter device or the receiver device to carry out the operations disclosed herein, including but not limited to operations of the foregoing method.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, may be combined with other embodiments.

BRIEF DESCRIPTION OF DRAWINGS

Features, aspects, and advantages of the presently disclosed technology may be better understood with regard to the following description, appended claims, and accompanying drawings where:

Figure 1:
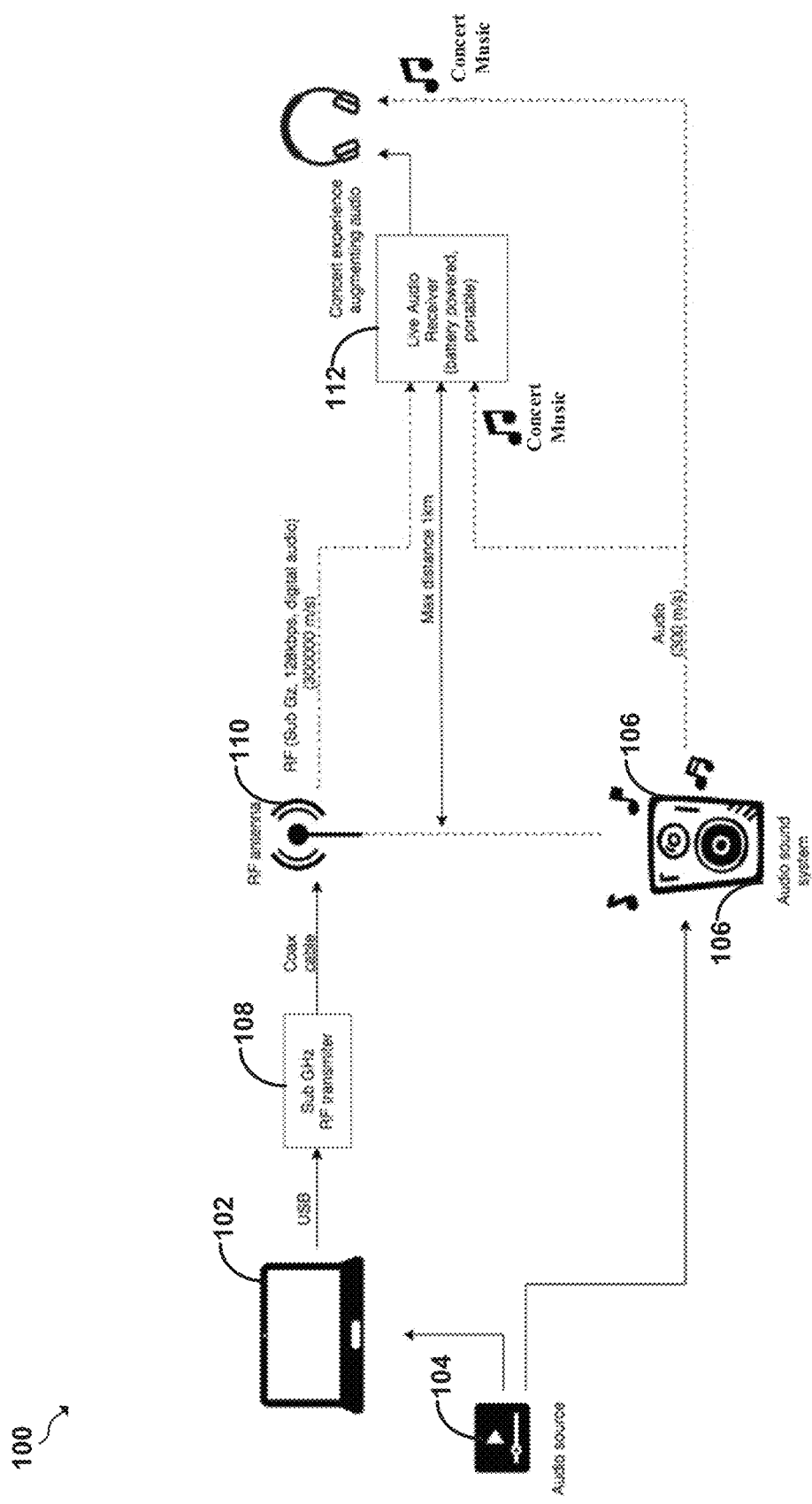
FIG. 1 is a conceptual diagram of a computing system that comprises a transmitter device and a receiver device in accordance with aspects of this disclosure.

In addition, the drawings are for the purpose of illustrating example embodiments, but it is understood that the present disclosure is not limited to the arrangements and instrumentality shown in the drawings.

DETAILED DESCRIPTION

II. Example Configurations

Referring now to the drawings, the drawings in this section depict example computing systems that comprise a receiver device and/or a transmitter device with which the embodiments, implementations, and examples of this disclosure may be implemented.

Turning now to FIG. 1, FIG. 1 is a conceptual diagram of an audio system 100 that includes a transmitter device 102 and a receiver device 112. In the example of FIG. 100, transmitter device 102 may be coupled to an audio source 104.

Audio source 104 produces one or more channels of audio signals that are input to transmitter device 102, and to and one or more loudspeakers 106 which convert the one or more channels of audio signals to soundwaves that may be audible to a listener. Audio source 104 may be coupled to the loudspeakers 106 in various manners using various different communication mediums. As one example, the loudspeakers 106 may be coupled to an audio source with loudspeaker cable. As another example, loudspeakers 106 may be coupled to the audio source 104 wirelessly using any of various wireless communication protocols such as any of the IEEE (Institute of Electrical and Electronics Engineers) 802.11x suite of protocols, as an example, or any other wireless communication protocol.

The transmitter device 102 and the receiver device 112 may each take the form of computing devices that may comprise one or more application-specific integrated circuits (ASICs), field programmable gate arrays (FPGAs), central processing units (CPUs), and/or digital signal processors (DSPs), etc. As an example, the transmitter device 102 may comprise a laptop, desktop, tablet, etc., that may be connected a component of the audio system. The receiver device 112 may generally be a portable computing device and may take the form of a wearable computing device in some instances.

At a high level, the receiver device 112 may be configured to receive the first audio signal and a second audio signal. Based on the first audio signal and the second audio signal, the receiver device 112 may determine a delay between the second audio signal and the first audio signal that is associated with the second audio signal. The receiver device 112 may be configured to receive the first audio signal and the second audio signal in various manners, and the first and second audio signals may take various forms.

In general, the receiver device 112 may rely on the transmitter device 102 in some manner to synchronize and/or generate one or more of the first audio signal or the second audio signal based on which the receiver device 112 determines a delay of the second audio signal relative to the first audio signal. According to an implementation, the transmitter device may be synchronized with the receiver device 112 in some manner. As one example, the transmitter device 102 and the receiver device 112 may be capable of synchronizing clock signals (referred to as "clocks") with each other for a period of time (e.g., hours, days, etc.). After synchronizing their respective clocks, the transmitter device 102 and the receiver device 112 may both play back audio 102 that forms the first audio signal that played back and received by the receiver device 112 according to the synchronized clock. As an example, the transmitter device 102 and the receiver device 112 may both be configured to playback audio of media items from a playback queue (e.g., a playlist stored locally or in the cloud) in synchrony with each other according to the respective synchronized clocks. As another example, the transmitter device 102 and the receiver device 112 may both play back a series of audible pulses at regular intervals in synchrony based on the respective synchronized clocks.

According to this implementation, the transmitter device 102 may be coupled to one or more audio components of the audio system, such as a mixer, amplifier, etc. The transmitter device 102 may output an electrical signal representation of the audio being played back via an audio interface such as an RCA, XLR, minijack, etc. The transmitter device 102 may output an electrical signal representation of the audio in various other manners as well.

One or more audio components of the audio system may receive and process the audio signal from the transmitter device. Each of these components may in turn output a processed version of the initial audio signal to another audio component of the audio system, and so on, until eventually and after some delay, one or more transducers of one or more loudspeakers receive the signal and convert the signal to audible soundwaves.

According to some examples, the receiver device 112 may be configured to receive, via an audio input interface, the processed audio signal that was originally generated by the transmitter device 102 and finally output by an audio component or the audible soundwave representation of the signal output by the transmitter device. According to some other examples, the receiver device 112 may be configured receive, via an audio input interface, soundwaves output by the one or more loudspeakers 106 that correspond to the signal that was output to the components of the audio system by the transmitter device 102. In any case, the signal received by the audio input interface of receiver device 112 forms the second audio signal for which the receiver device 112 is to determine a delay. The receiver device 112 may be configured to receive the second audio signal in various manners.

According to some examples, the receiver device 112 may be configured to receive the second signal via an audio input interface, such as a microphone input or a line level input (such as an XLR input) of the receiver device 112. In some instances, the receiver device 112 may comprise or may be connected via the microphone interface to a microphone. In instances which the receiver device 112 is coupled to a microphone, the microphone may convert audible soundwaves to an electrical signal that forms the second audio signal. In this manner, the receiver may be configured to capture audible soundwaves from one or more loudspeakers 106 that form the second audio signal using the microphone interface. In other instances, the receiver device 112 may be connected via one or more audio components such as a mixing board, amplifier, effects processor, etc., to the transmitter device 102 via a line level input of the receiver device.

Both the microphone and level audio input interfaces that the receiver device 112 uses to receive the second audio signal may generally be analog audio input interfaces. For easier signal processing, after receiving the second audio signal in an analog format, the receiver device 112 may convert any audio signals received in an analog format to a digital format. The receiver device 112 may employ an analog-to-digital conversion such as I²S to convert the analog audio signal to a digital audio signal, which may be a pulse channel modulation (PCM) format. The receiver device 112 may perform the functions of converting the analog audio signal to a digital audio signal in various other manners as well.

In the above-described manners, the receiver device 112 may receive the second audio signal from the transmitter device 102 via line level electrical input of the receiver device.

According to some other implementations, which are illustrated in FIG. 1, transmitter device 102 may be coupled to an RF transmitter 108 that is in turn coupled to an RF antenna 110 that transmits a first audio signal that may be received by receiver device 112. Transmitter device 102 may be coupled to RF transmitter 108 in various manners. According to the implementation illustrated in FIG. 1, transmitter device 102 may be coupled to RF transmitter 108 via an interface, such as a Universal Serial Bus (USB) interface. Transmitter device 102 may be coupled to RF transmitter 108 in various other manners as well.

According to the implementation illustrated in FIG. 1, RF transmitter 108 may comprise a sub-gigahertz RF transmitter that is coupled to RF antenna 110 with a coaxial cable. In response to a signal received from RF transmitter 108, RF antenna 110 may output a sub-gigahertz audio signal.

According to one example, transmitter device 102 and/or RF transmitter 108 may be configured to convert the audio signal to a format that is suitable for digital wireless transmission. As an example, transmitter device 102 may convert the audio signal received from the audio source to an audio format that is suitable for digital wireless transmissions that may comprise a digital audio format. Examples of such digital audio formats may comprise lossy digital audio formats such as MP3, OPUS, OGG Vorbis, Advanced Audio Codec (AAC) or any other digital audio format. The digital audio format suitable for wireless transmission may take various other forms as well.

It may generally be desirable to minimize the amount of time (i.e., the latency) that the transmitter spends encoding the received audio signal. In order to minimize the encoding time, it may be desirable to utilize an audio codec that provides low encoding latency. One example of such a low encoding latency codec is the OPUS codec. However, it should be understood that other codecs may provide suitably low latency as well.

The transmitter device may encode the received audio signal in the digital audio format using various audio encoding parameters. As an example of such parameters, the transmitter device 102, may encode the received audio signal with a given bitrate and at a given sampling frequency. According to some implementations, the transmitter device 102 may encode the audio signal received from the audio source with a 128 kilobyte per second bitrate and a 48 kHz sampling rate. The transmitter device 102 may encode the audio signal received from the audio source using various other encoding parameters as well.

In some implementations, the transmitter device 102 may be configured to reduce the complexity of the received audio signal before encoding the received audio signal. The functions of reducing the complexity of the received audio signal may take various forms. As one example, the transmitter device may be configured to remove a certain audible frequency spectrum, such as the low audible frequency spectrum, of the received audio signal. Removing the low audible frequency spectrum of the received audio signal may serve various purposes. First, any removing of the audible frequency range may reduce the size of the encoded version of that audio signal. Second, removing a given audible frequency range may reduce piracy of the encoded audio signal in that even if an eavesdropper were to capture the encoded version of the audio signal, the eavesdropper would not be able to capture the full audible spectrum of the audio signal due to captured signal having an audible portion removed.

Finally, after encoding the audio to a digital format, the transmitter device 102 or RF transmitter 108 may encapsulate the encoded audio data into one or more datagrams and transmit the datagrams via RF antenna 110 to the receiver device 112. The functions of the transmitter device encapsulating the encoded audio into datagrams may take various forms.

As some examples, the transmitter device 102 may convert the encoded audio into datagrams of a networking protocol that is suitable for wireless transmission. Examples of such wireless-compatible protocols may comprise: Wi-Fi protocols (i.e. the IEEE 802.11x suite of protocols), so-called "white space" protocols that operate on available frequency spectrum, ZIGBEE, WI-MAX, Z-WAVE, Internet of Things (IoT) communication protocols, protocols that utilize Industrial Scientific, Medicine (ISM) frequency bands or any other type of digital wireless communication protocol. The wireless protocols may take various other forms as well.

As part of formatting the encoded audio into datagrams, the transmitter device 102 or RF transmitter 108 may also encrypt the datagrams used for wireless communications of a given wireless protocol. The transmitter device 102 may encrypt the wireless communications in various manners. As one example, the transmitter device 102 may use a symmetric encryption algorithm such as AES, an asymmetric key algorithm, such as the RSA or Diffie-Hellman algorithms, or a combination thereof. The transmitter device 102 may encrypt the wireless communications in various other manners as well.

Although the forgoing implementation has been described in terms of a transmission from the transmitter device 102 to the receiver device 112 using one channel of audio, it should be understood that in other embodiments the transmitter device 102 may be configured to transmit up to eight (or more, in other embodiments) channels of audio, and the receiver device 112 may be configured to receive up to eight (or more in other embodiments) channels of audio. For instance, in some embodiments, the transmitter device 102 may be configured to transmit different portions of the first audio signal on different channels. In some implementations of this, the transmitter device 102 may transmit a first audible frequency range of the first audio signal on a first channel, a second audible frequency range of the first audio signal on a second channel, and so on. In other implementations of this, the transmitter device 102 may divide the first audio signal into portions, and transmit, for instance, a third of the portions on a first channel, a third of the portions on a second channel, and a third of the portions on a third channel. Other examples of transmitting different portions of the first audio signal on different channels are possible as well.

Additionally or alternatively, the transmitter device 102 may be configured to transmit different versions of the first audio signal on different channels. For instance, the transmitter device may be configured to transmit a first-language version (e.g., Spanish) of the first audio signal on a first channel and a second-language version (e.g., English) of the first audio signal on a second channel. Other examples of transmitting different versions of the first audio signal on different channels are possible as well.

The receiver device 112 may include a radio frequency (RF) antenna (not pictured) that is capable of receiving the encoded wireless signal from the transmitter device 102. While the transmitter 102 is transmitting encoded audio and the receiver device is powered on, the receiver device 112 may be configured to receive and decode the encoded audio signal received from the transmitter device 112 via the RF antenna of the receiver device 112.

The receiver device 112 may receive signals modulated on various frequencies via the RF antenna. Upon initialization of the receiver device 112, the receiver device 112 may be configured to establish a connection with a transmitter device. The process of establishing a connection with the transmitter device 102 may take various forms. According to one implementation, the receiver device 102 may be configured to establish a connection with the transmitter device by negotiation connection parameters with the transmitter device 102. According to another implementation, the receiver device 112 may be pre-configured with the parameters necessary to communicate with the transmitter device. Examples of such parameters may include a frequency band (such as a channel) used to communicate with the transmitter device 102, encryption parameters, such as a pre-shared key, public key of the transmitter device 102, etc. The connection parameters and the process of connecting with the transmitter device 102 may take various other forms as well.

The receiver device 112 may decode the first audio signal received from the transmitter device 102 in a process that is generally inverse to the encoding process described with respect to the transmitter device.

Figure 2:
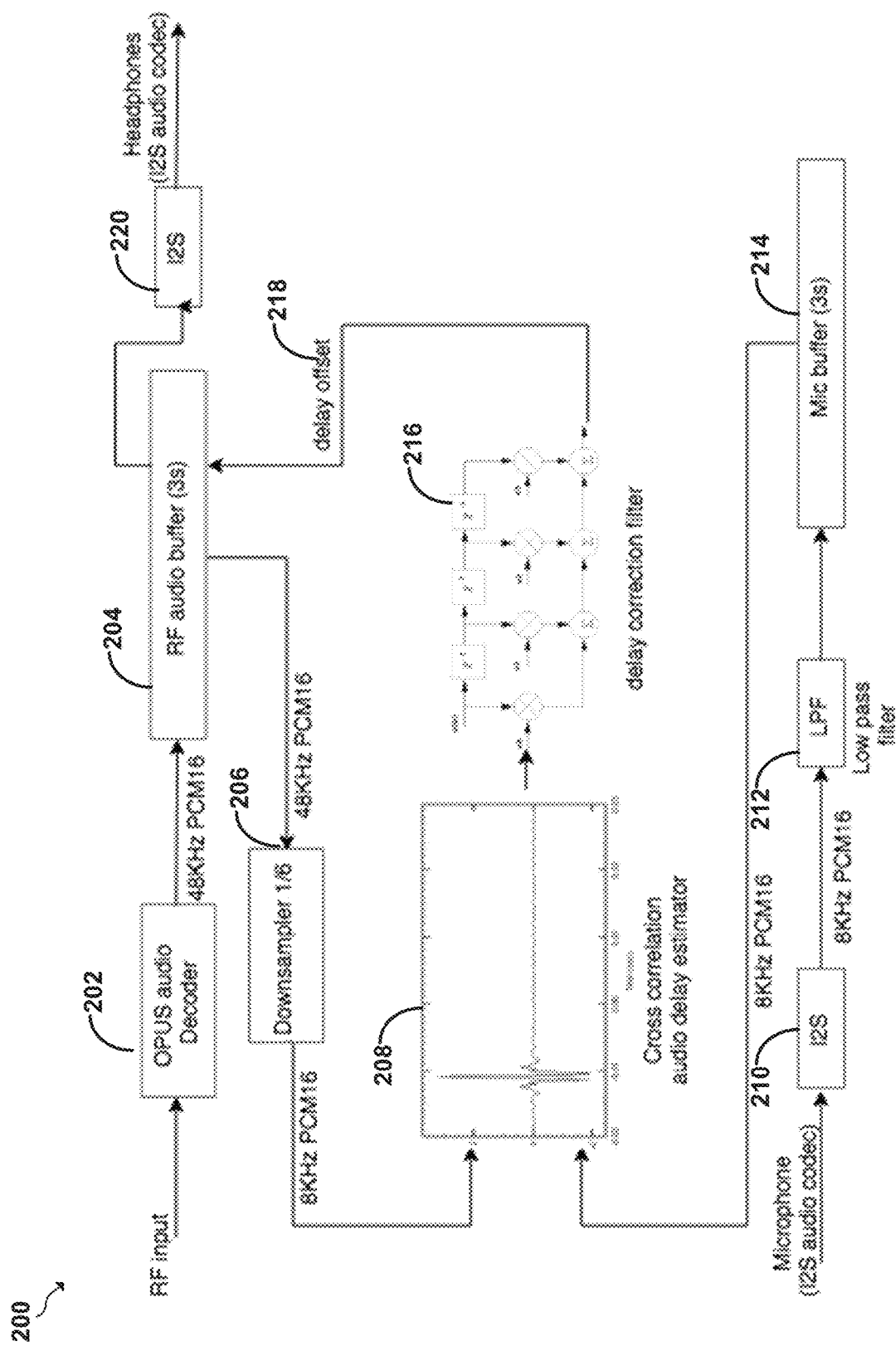
FIG. 2 is a conceptual diagram of a transmitter device in accordance with aspects of this disclosure.

Turning now to FIG. 2, a conceptual diagram of a receiver device 200 is illustrated. At a high level, receiver device 200 may be similar to receiver device 112 illustrated in FIG. 1. At a high level, receiver device 200 may be configured to receive a first audio signal via a first input, such as an RF input, a second audio signal via a second input, such as a microphone input, and determine a delay between the second audio input and the first audio input, wherein the delay is associated with the second audio signal. After determining the delay, the receiver device 200 may optionally perform various additional functions. The operation of receiver device 200 in relation to the foreminded delay determination functions and the various additional functions will now be described in greater detail.

In some implementations, receiver device 200 may include a radio frequency (RF) antenna that is capable of receiving the encoded wireless signal from a transmitter device such as transmitter device 102. While the transmitter device is transmitting encoded audio and the receiver device 200 is powered on, the receiver device 200 may be configured to receive and decode the encoded audio signal received from the transmitter device via the RF antenna of the receiver device 200.

The receiver device 200 may receive signals that are modulated on various frequencies via the RF antenna. Upon initialization of the receiver device, the receiver device 200 may be configured to establish a connection with a transmitter device. The process of establishing a connection with the transmitter device may take various forms. According to one implementation, the receiver device 200 may be configured to establish a connection with the transmitter device by negotiation connection parameters with the transmitter device. According to another implementation, the receiver device 200 may be pre-configured with the parameters necessary to communicate with the transmitter device. Examples of such parameters may include a frequency band (such as a channel) used to communicate with the transmitter device, encryption parameters, such as a pre-shared key, public key of the transmitter, etc. The connection parameters and the process of connecting with the transmitter device may take various other forms as well.

The receiver device 200 may decode the first audio signal received from the transmitter device in a process that is generally inverse to the encoding process described with respect to the transmitter device with respect to FIG. 1. More particularly, the receiver device 200 may receive a sequence of datagrams that represent an encoded version of the first audio signal. The datagrams may arrive out of order in some cases. If any of the datagrams arrive out of order, the receiver device 200 may reorder the datagrams into their correct order and may assemble the datagrams into chunks of data that form a stream of encoded audio that correspond to the first audio signal. After re-assembling the chunks of data that form the stream of encoded audio data, a decoder 202 of the receiver device 200 may decode the stream of encoded audio data by inversely transforming the encoded audio data and thereby convert the encoded audio data from the encoded format, (e.g., the OPUS format or another compressed audio format) to an uncompressed format, such as a 48 kHz, Pulse Channel Modulation (PCM) 16 format. The above-described techniques are but one example of a manner in which the transmitter device and receiver device 200 may wirelessly communicate the first audio signal. The transmitter device and receiver device 200 may wirelessly communicate the first audio signal in various other manners as well.

Regardless of the manner in which the receiver device 200 receives the first and second audio signals, the receiver device 200 may then determine a delay associated with the second audio signal. The function of the receiver determining a delay associated with the second audio signal may take various forms.

According to some implementations, the receiver device 200 may be configured to output an indication of the determined delay 218 between the second and first audio signals. Based on the outputted indication of the determined delay between the second and first audio signals, a user of the receiver device 200 may be able to utilize the delay determined by the receiver device 200 to configure various components of an audio system to account for the determined delay.

According to another implementation, and also as described above with respect to FIG. 1, the receiver device 200 may receive the first audio signal via an audio input interface, for instance by playing back audio in synchrony with a transmitter device 102 based on a synchronized clock signal. The receiver device 200 may receive the first audio signal in various other manners as well Regardless of whether the receiver device 200 receives the first audio signal wirelessly or via an audio input interface, in the first audio signal that the receiver device 200 receives may be in an uncompressed format, such a PCM format. In response to receiving the first audio signal, the receiver device 200 may store the uncompressed audio of the first signal in a buffer, which is referred to herein as a "Radio Frequency (RF) buffer 204." The RF buffer 204 may be implemented in software and/or hardware and may store a fixed duration of audio, for instance storing three seconds of audio, as an example. The RF 204 buffer may take various other forms and may be various other sizes as well.

After storing the audio in the buffer, at block 206, the receiver device 200 may be configured to downsample the frequency of the buffered audio stored in the RF buffer. According to an example implementation, the receiver device 200 may be configured to downsample the buffered audio by $1/6^{th}$ and thereby produce downsampled audio at an 8 kHz sampling rate and in a PCM16 audio format. The receiver device 200 may utilize various other downsampling functions as well or may not perform downsampling according to various other implementations as well. After downsampling the buffered audio, the receiver device 200 may input the downsampled audio into a cross-correlation filter 208 as will be described in greater detail.

While the receiver device 200 receives and stores the first audio in the RF buffer 204, the receiver device 200 may simultaneously receive the second audio signal. In some cases, the second audio signal may be received in an analog format rather than a digital format. In these cases, the receiver device 200 converts analog audio captured by the microphone into a digital format. The receiver device 200 may convert the captured analog audio into a digital format using an analog-to-digital conversion process. According to a preferred implementation, the receiver device 200 may employ an analog-to-digital conversion such as Inter-IC Sound ($I^2S$) 210 to convert the analog audio signal to a digital audio signal. The receiver device 200 may convert the analog signal to a digital audio signal in various other manners as well.

After optionally converting the second audio signal from analog to digital, the receiver device 200 may remove the same range of audible frequencies that were removed from the first audio signal. As an example, if the first audio signal has low audible frequencies removed, the receiver device 200 may remove low audible frequencies from the digital representation of the second audio signal, for instance using a low-pass filter 212. The receiver device 200 may remove certain ranges of audible frequencies from the first and/or second audio signals in various other manners as well.

After filtering the second audio signal, the receiver device 200 may store the filtered second audio signal. According to an implementation, the receiver device 200 may store the filtered second audio signal in a second buffer which may be referred to herein as a "microphone buffer 214." The microphone buffer 214 may be implemented in software and/or hardware and may be capable of storing various amounts of audio, for instance, three seconds of audio, according to one example. The microphone buffer 214 may take various other forms and may be various other sizes as well.

After the receiver device 200 stores a portion of the first audio signal in the RF buffer 204 and a portion of the second audio signal in the microphone buffer, the receiver device 200 may input some audio stored in the RF and microphone buffers 204 and 214 into one or more filters (e.g., filters 208, 216) that may determine and optionally correct for a delay between the first audio signal stored in the RF buffer 204 and the second audio signal stored in the microphone buffer 214. The receiver device 200 may determine the delay associated with the second audio signal relative to the first audio signal in various manners.

According to an implementation, receiver device 200 may utilize one or more filters to determine the delay between the portion of the first audio signal and the portion of the second audio signal stored in the RF and microphone buffers 204 and 214, respectively. According to some examples, the one or more filters may comprise a cross-correlation audio delay estimator 208, which may determine the time delay between the audio stored in the microphone buffer 214 and a downsampled version of the audio stored in the RF audio buffer 204. At a high level, the cross-correlation filter 208 calculates the time delay between two different signals A (which may correspond to the downsampled version of the audio stored in the RF buffer 204) and B (which may correspond to the audio stored in the microphone buffer 214) by calculating the convolution of the first signal A with the inverse of the second signal B. The receiver device 200 may determine the delay between the stored portions of the first audio signal and the second audio signal in various other manners. After determining a delay between the stored portions of the first audio signal and the second audio signal, the receiver device 200 may perform various functions based on determining the delay.

A. Delay Output

According to one implementation, a user of the receiver device 200 may be configured to output the determined delay. Afterwards a user of the receiver device may then utilize outputted the delay in various manners.

According to some implementations, a user of the receiver device 200 may issue an input that may trigger the receiver device to store portions of the first and second audio signals in the RF and microphone buffers 204 and 214, determine a delay between the second and first audios signals, and output the determined delay. The user input received by the receiver device 200 and the output generated by the receiver device 200 may take various forms.

According to some implementations, the receiver device may comprise one or more physical buttons. According to other implementations, the receiver device may display a user interface at a display (e.g., of the receiver device 200) comprising one or more virtual buttons. In any case, a user of the receiver device 200 may press or select one of the buttons to trigger the receiver device 200 to capture (i.e., store) portions of the first and/or second audio signals in the RF and microphone buffers 204 and 214 and determine the delay between the captured portions of the first and second audio signals.

In some cases, after receiving the selection of a button that triggers the receiver device to determine the delay, the receiver device may output (e.g., display) the determined delay that is based on the signal received from the transmitter device and the audio captured from the environment using the microphone of the receiver device. The function of outputting the determined delay at the display may take various forms.

The output of the delay may take various forms. According to one example, the receiver device 200 may display a representation of a calculated delay in units of time such as seconds, milliseconds, microseconds, etc. According to another example, the receiver device 200 may be configured to convert the calculated delay from seconds to units of distance (e.g., meters, feet, etc.) that represent the distance travelled by sound over the time of the delay. For instance, if a calculated delay is 100 milliseconds, the receiver device may calculate the distance traveled by sound over the 100 milliseconds (equal to 0.1 seconds) by multiplying the speed of sound in air (343 meters/second) by 0.1 seconds to determine that the sound traveled 34.3 meters. In turn, the receiver device 200 may display the calculated distance that represents the determined delay. A user may then use the calculated distance to determine the distance from the user's location to a given loudspeaker or cluster of loudspeakers.

The receiver device 200 may output the determined delay in various other manners as well.

After the receiver device outputs a delay a user may, in turn, utilize the determined delay that the receiver devices outputs in various other manners as well.

According to one example, a user may utilize the receiver device to determine a processing delay of a component, such as a mixer or another audio processing component. According to this example, the transmitter device may be connected to, and may output an audio signal to an input of the audio processing device, and an audio input of the receiver device 200 may be connected to an output of the audio processing device. To determine a delay associated with the connected processing component, the user may select a button to trigger the receiver device 200 to determine a delay associated with the audio signal received from the audio processing component and finally output the determined delay. Based on the delay output by the receiver device, the user may determine whether the delay is within an acceptable range and may make adjustments to the configuration of the audio system to reduce the processing delay if the determined processing delay is outside the acceptable range.

As another example, the user may use the receiver device 200 to calculate respective delays at a given listening position for each loudspeaker in a home theater system. A user may utilize the respective delays for each speaker to reconfigure the home theater system. In turn, based on the delay outputted by the receiver device 200, the user may then calibrate the loudspeakers such that each of the loudspeakers has a same delay. By calibrating each loudspeaker to have the same delay, the audio fidelity of such a home theatre system may be improved such that sound waves produced by each speaker arrive at a listener's ears at the same time.

As another example, a user may calibrate the utilize the delay outputted by the receiver device to calibrate a loudspeaker system of a performance venue which may comprise clusters of loudspeakers that are positioned at different locations throughout the performance venue, and each of which may have a different associated delay. To calculate the delay for each cluster of loudspeakers, a user of the receiver of the receiver device may stand in front of each cluster and may trigger the receiver device to calculate the delay for the cluster based on the audio received via the microphone of the receiver device for that respective cluster of loudspeakers. The user may then configure the performance venue's audio system to correct for each delay for each respective cluster of loudspeakers.

According to yet further examples of the delay and output implementations, the receiver device may be configured to store two (or more) delays and to and calculate and output (e.g., display) the difference between the two stored delays. A user of the receiver device may use the difference of the two delays to calibrate and correct for the delay associated with one or more speakers such as a cluster of loudspeakers. As a more particular example, a user may position him or herself in front of the delay cluster and may use one or more buttons of the receiver device to trigger the receiver device to determine and store the first measurement comprising a delay that is associated with the primary audio source.

Next, the user may then turn off the primary audio source and turn on the delay cluster. After turning on the delay cluster, the user may press the button on the receiver device to trigger the receiver device to determine a second measurement comprising a second delay that is associated with the primary audio source. After calculating the first and second delays the user may press the same button or a different button to cause the receiver to calculate and display the difference between the first and second delays. Finally, the user may configure the audio system that includes the clusters of loudspeakers using the calculated delay difference by adding the calculated time offset difference to the first cluster of loudspeakers. The aforementioned examples are just some examples of manners in which the delay output determined by the receiver device 200 may be used. Outputted delays may be used in various other manners as well.

B. Audio Output

According to some implementations, after the receiver device 200 determines the delay between the first and second audio signals, the receiver device may also output the first audio signal based on the determined delay. The functions of outputting the second audio signal based on to the determined delay may take various forms.

According to some examples, the receiver device 200 may first attempt to correct for the delay using one or more filters that may also take various forms. According to some examples, the one or more filters may comprise a delay correction filter 216. The delay correction filter may correct for the determined delay by applying the determined delay 218 to the output of the audio data stored in the RF buffer 204 by the delay.

After delaying the output of the audio stored in the RF buffer 204, the receiver device 200 may output the digital audio stored in the RF buffer 200 based on the determined delay 218. The functions of outputting the stored digital audio may generally involve a digital-to-analog conversion. The digital-to-analog process may generally be the reverse of the analog-to-digital conversion process that the receiver device performs when receiving and converting an analog signal to a digital signal. As with the analog-to-digital conversion that the receiver device performs, the receiver device 200 may be configured to use I²S 220 to convert the digital audio signal, which may be in a PCM format, to a digital audio signal.

Finally, after converting the digital audio signal to an analog signal, the receiver device 200 may output the audio signal at an audio output interface of the receiver device. The audio output interface may take various forms. As one example, the audio output interface may take the form of a minijack that may be connected to the receiver device. A user of the receiver device may listen to the audio output by the receiver device using a pair of headphones in different contexts and for various purposes.

In an additional embodiment, receiver device 200 and/or transmitter device 102 may be configured to cause the transmitter device 102 to stop the transmission of the first audio signal in response to determining that the receiver device 200 is either out of range of the transmitter device 102 and/or the delay between the first audio signal and the second audio signal as determined by the receiver device 200 is greater than a threshold amount of delay. This may be carried out in various ways. According to one implementation, the transmitter device 102 may determine that the receiver device 200 is out of range of the transmitter device 102 and responsively stop transmitting the first audio signal. For example, in some configurations, the receiver device 200 may periodically (or at other times) transmit to transmitter device 102 an acknowledgement signal that indicates to the transmitter device 102 that receiver device 200 is still in range of transmitter device 102 and, perhaps, still successfully receiving signals from transmitter 102. In accordance with this implementation, if transmitter device 102 fails to receive any acknowledgment signal from receiver 200 within a threshold period of time (e.g., 5.0 seconds), then transmitter 102 may construe this failure as a determination that receiver device 200 is no longer within range of the transmitter device 102 and transmitter device 102 may responsively stop transmitting the first audio signal to receiver 200. Transmitter device 102 may resume transmission of the first audio signal upon determining that receiver device 200 has come back into range of transmitter 102, which transmitter device 102 may determine, by for example, receiving from receiver device 200 an acknowledgement signal. Other ways of may determine that the receiver device 200 is out of range of the transmitter device 102 and/or determining that receiver device 200 has come back into range of transmitter 102 are possible as well.

According to another implementation, the receiver device 200 may determine that the delay between the first audio signal and the second audio signal is greater than a threshold amount of delay (e.g., 750 milliseconds) and may responsively transmit an indication of this fact to transmitter 102. Transmitter 102, upon receiving such an indication from receiver device 200, may responsively stop transmitting to receiver device 200 the first audio signal. An increase in the delay between the first audio signal and the second audio signal that results in the delay being greater than a threshold amount of delay, may result from, for instance, a listener taking the receiver device 200 into a bathroom or away from the performance venue. Sometime later, the receiver device 200 may determine that the delay between the first audio signal and the second audio signal is less than the threshold amount of delay (e.g., 750 milliseconds) and may responsively transmit an indication of this fact to transmitter 102. Transmitter 102, upon receiving such an indication from receiver device 200, may responsively resume transmitting to receiver device 200 the first audio signal. Other ways of determining that the delay between the first audio signal and the second audio signal is greater than a threshold amount of delay and responsively stopping transmission of the first audio signal to receiver device 200, as are other examples of threshold amounts of delay, are possible as well.

Various functions that are performed by receiver device 200 have been described. Various components of receiver device 200 will now be described in greater detail.

Figure 3:
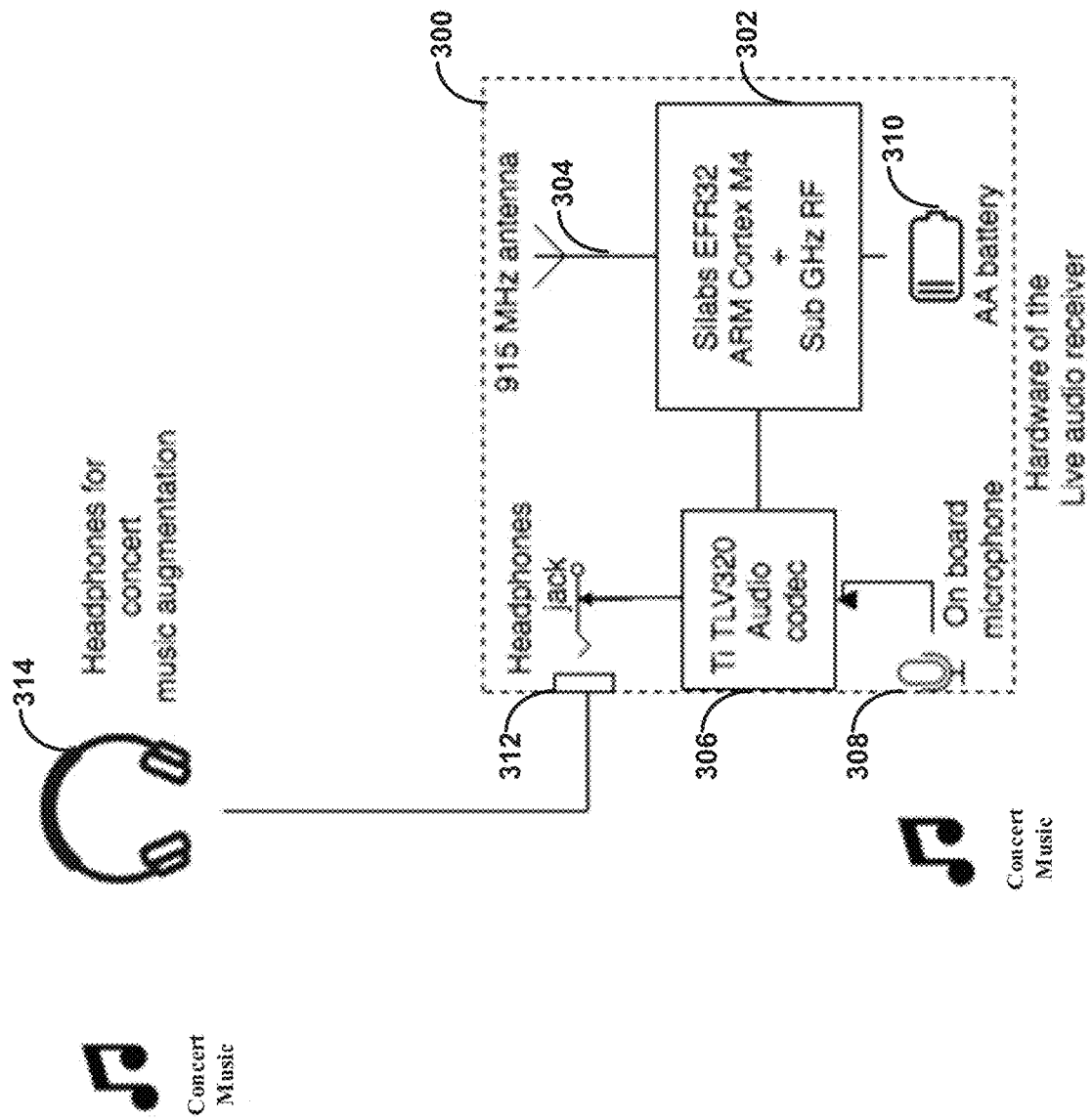
FIG. 3 is a conceptual diagram of a receiver device in accordance with aspects of this disclosure.

Turning now to FIG. 3, a block diagram of a receiver device 300 is illustrated. According to some examples, the receiver device 300 may comprise a battery-powered wearable computing device. A user of the receiver device may wear the receiver device, for instance using a lanyard, clip, or another fastening system that allows the user to wear or have the receiver device on his or her person without having to hold the device in his or her hands. A user of the receiver device may wear the receiver device, for example at a performance venue during a live concert performance. While wearing the receiver device during the performance, the user may listen to the audio output by the receiver device through a pair of headphones to enhance the audio that the user hears from the loudspeakers at the performance venue.

While reference to a single receiver device, such as receiver device 300, is made for purpose of example, it should be understood that multiple receiver devices that are similar to receiver device 300 may be configured to receive a same or similar signal from a transmitter device, such as transmitter device 102. As an example, multiple receiver devices, each of which may be worn or held by a listener at a live concert venue, may receive an audio signal from transmitter device 102, and may be configured to generate audio output based on the audio signal received from transmitter device 102. Multiple receiver devices may be used in various other configurations as well.

Receiver device 300 may comprise at least one processor 302, a battery 310, an antenna 304, an audio codec 306, an onboard microphone 308, and a headphones jack 312. Battery 310 may generally power receiver device 300 and may comprise an AA battery according to some examples but may take various other forms as well.

At a high level, processor 302 of receiver device 300 may be configured to obtain a first audio signal via antenna 304 that is connected to processor 302, and a second audio signal via microphone 308 that is connected with an audio input interface to audio codec 306, determine a delay between the second audio signal, and optionally output an audio signal based on the determined delay. According to some examples, processor 302 may comprise a Silabs EFR32 ARM Cortex M4 having a sub-gigahertz RF module. Processor 302 may take various other forms as well.

Audio codec 306 may be configured to convert the analog signal of the audio input interface to a digital signal that processor 302 is capable of processing. According to some implementations, codec 306 may comprise a Texas Instruments (TI) TLV320 audio codec. Codec 306 may take various other forms as well.

Responsive to receiving the first audio signal and the digital version of the second audio signal, processor 302 may determine a delay between the second audio signal and the first audio signal, for instance using the figures described with respect to FIG. 2. According to some examples, receiver device 300 may be further configured to output an indication of the determined delay and/or to output the first audio signal according to the determined delay via a display of receiver device 300 (not pictured). Processor 302 may be configured to perform various other functions as well.

Figure 4:
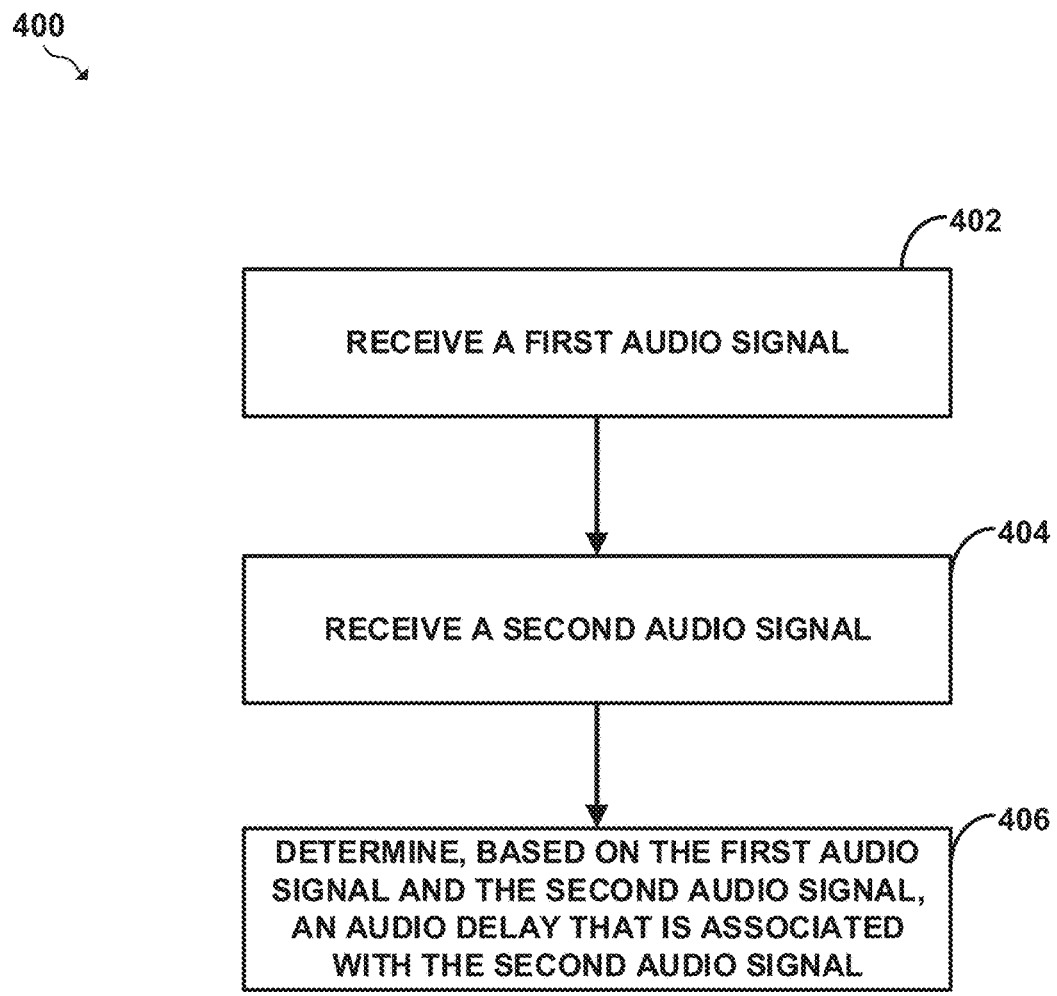
FIG. 4 is a flow diagram of an example method for determining a delay associated with a first audio and a second audio signal in accordance with aspect of this disclosure.

Turning now to FIG. 4, a flowchart illustrating a method 400 for determining a delay between a second audio signal and a first audio signal are illustrated. For the purpose of example method 400 is described as being carried out by receiver device 300. However, it should be understood that various other components described with respect to FIGS. 1-3 may carry out the functions of method 400 as well.

The method of FIG. 4 begins as block 402 at which point receiver device 300 may receive a first audio signal determine.

At block 404, receiver device 300 may receive a second audio signal. At block 406, receiver device 300 may determine, based on the first audio signal and the second audio signal, an audio delay that is associated with the second audio signal.

Various implementations and examples associated with the present embodiment related to regenerative braking have been described. However, it should be understood that the present embodiment may take various other forms as well.

III. Conclusion

Various inventions have been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. While the embodiments discussed herein may appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A first computing device comprising:
an audio input interface;
at least one processor;
a non-transitory computer readable medium; and
program instructions stored on the non-transitory computer readable medium that are executable by the at least one processor such that the first computing device is configured to:
establish a connection with a second computing device;
coordinate with the second computing device to produce one or more audio signals in synchrony, thereby producing a first audio signal;
receive, via a first input of the audio input interface, the first audio signal;
store at least a portion of the first audio signal in a first buffer;
after receiving the first audio signal, receive, via a second input of the audio input interface, a second audio signal transmitted from the second computing device;
store at least a portion of the second audio signal in a second buffer;
based on the portion of the first audio signal stored in the first buffer and the portion of the second audio signal stored in the second buffer, determine an audio delay that is associated with the second audio signal relative to the first audio signal; and
after determining the audio delay, output at least a representation of the determined audio delay.

2. The first computing device of claim 1, wherein the program instructions that are executable by the at least one processor such that the first computing device is configured to receive, via the first input of the audio input interface, the first audio signal comprise program instructions that are executable by the at least one processor such that the first computing device is configured to:
receive, via an antenna of the first computing device, the first audio signal.

3. The first computing device of claim 1, wherein the program instructions that are executable by the at least one processor such that the first computing device is configured to output at least a representation of the determined audio delay comprise program instructions that are executable by the at least one processor such that the first computing device is configured to:
output the representation of the determined audio delay at a display of the first computing device.

4. The first computing device of claim 1, wherein the program instructions that are executable by the at least one processor such that the first computing device is configured to determine the audio delay comprise program instructions that are executable by the at least one processor such that the first computing device is configured to:
receive a user input; and
determine the audio delay in response to the user input.

5. The first computing device of claim 1, further comprising program instructions stored on the non-transitory computer readable medium that are executable by the at least one processor such that the first computing device is configured to:
decode the first audio signal with a lossy audio decoder;
downsample the first audio signal to produce a downsampled audio signal;
after receiving the second audio signal, apply a filter to the second audio signal to remove a range of audible frequencies of the second audio signal and thereby produce a filtered second audio signal; and
wherein the program instructions that are executable by the at least one processor such that the first computing device is configured to determine the audio delay comprise program instructions that are executable by the at least one processor such that the first computing device is configured to:
determine a cross-correlation between the downsampled audio signal and the filtered second audio signal; and
determine the audio delay based on the cross-correlation.

6. The first computing device of claim 5, further comprising program instructions stored on the non-transitory computer readable medium that are executable by the at least one processor such that the first computing device is configured to:
apply, to the portion of the first audio signal stored in the first buffer, a time delay that is equal to the determined audio delay; and
play back, with an audio output interface of the first computing device, the portion of the first audio signal stored in the first buffer according to the applied time delay.

7. The first computing device of claim 1, wherein the program instructions stored on the non-transitory computer readable medium that are executable by the at least one processor such that the first computing device is configured to coordinate with the second computing device to produce one or more audio signals in synchrony, thereby producing the first audio signal comprise program instructions stored on the non-transitory computer readable medium that are executable by the at least one processor such that the first computing device is configured to:
synchronize a first clock of the first computing device with a second clock of the second computing device; and
determine the first audio signal based on the first clock, wherein the first audio signal is synchronized with the second clock.

8. The first computing device of claim 7, wherein the program instructions that are executable by the at least one processor such that the first computing device is configured to receive the first audio signal comprise program instructions that are executable by the at least one processor such that the first computing device is configured to:
based on the first clock, play back, in synchrony with the second computing device, at least one media item from an audio queue; and
wherein the first audio signal is received from the playback of the at least one media item.

9. The first computing device of claim 1, wherein the audio input interface comprises one or both of a microphone input or a line level input.

10. The first computing device of claim 1, wherein the audio delay comprises a second delay, the first computing device further comprising program instructions that are executable by the at least one processor such that the first computing device is configured to:
determine a first delay associated with the first audio signal;
store the first delay;
store the second delay;
determine a difference between the first delay and the second delay; and output a representation of the difference between the first delay and the second delay.

11. A system comprising:
a first computing device; and
a second computing device;
wherein the first computing device comprises:
  an audio input interface;
  at least one first processor;
  a first non-transitory computer readable medium; and
  first program instructions stored on the first non-transitory computer readable medium that are executable by the at least one first processor such that the first computing device is configured to:
    coordinate with the second computing device to produce one or more audio signals in synchrony, thereby producing a first audio signal;
    receive, via a first input of the audio input interface, the first audio signal;
    store at least a portion of the first audio signal in a first buffer;
    after receiving the first audio signal, receive, via a second input of the audio input interface, a second audio signal transmitted from the second computing device;
    store at least a portion of the second audio signal in a second buffer;
    based on the portion of the first audio signal stored in the first buffer and the portion of the second audio signal stored in the second buffer, determine an audio delay that is associated with the second audio signal relative to the first audio signal; and
    after determining the audio delay, output at least a representation of the determined audio delay; and
wherein the second computing device comprises:
  at least one second processor;
  a second non-transitory computer readable medium; and
  second program instructions stored on the second non-transitory computer readable medium that are executable by the at least one second processor such that the second computing device is configured to:
    transmit one of the first audio signal or the second audio signal to the first computing device.

12. The system of claim 11, wherein the first program instructions stored on the first non-transitory computer readable medium further comprise program instructions that are executable by the at least one first processor such that the first computing device is configured to:
  decode the first audio signal with a lossy audio decoder;
  downsample the first audio signal to produce a downsampled audio signal;
  after receiving the second audio signal, apply a filter to the second audio signal to remove a range of audible frequencies of the second audio signal and thereby produce a filtered second audio signal; and
  wherein the first program instructions that are executable by the at least one first processor such that the first computing device is configured to determine the audio delay comprise program instructions that are executable by the first at least one first processor such that the first computing device is configured to:
    determine a cross-correlation between the downsampled audio signal and the filtered second audio signal; and
    determine the audio delay based on the cross-correlation.

13. The system of claim 11, wherein the first program instructions stored on the first non-transitory computer readable medium further comprise program instructions that are executable by the at least one first processor such that the first computing device is configured to:
  apply, to the portion of the first audio signal stored in the first buffer, a time delay that is equal to the determined audio delay; and
  play back, with an audio output interface of the first computing device, the portion of the first audio signal stored in the first buffer according to the applied time delay.

14. The system of claim 11, wherein the first program instructions that are executable by the at least one first processor such that the first computing device is configured to coordinate with the second computing device to produce one or more audio signals in synchrony, thereby producing a first audio signal comprise program instructions that are executable by the at least one first processor such that the first computing device is configured to:
  synchronize a first clock of the first computing device with a second clock of the second computing device, wherein the first audio signal is synchronized with the second clock;
  based on the first clock:
    play back, in synchrony with the second computing device, at least one media item from an audio queue; and
    determine the first audio signal, wherein the first audio signal is received from the playback of the at least one media item.

15. The system of claim 11, wherein the audio delay comprises a second delay, and wherein the first program instructions further comprise program instructions that are executable by the at least one first processor such that the first computing device is configured to:
  determine a first delay associated with the first audio signal;
  store the first delay;
  store the second delay;
  determine a difference between the first delay and the second delay; and
  output a representation of the difference between the first delay and the second delay.

16. The system of claim 11, wherein the second computing device is configured to be coupled to a mixer device, and wherein the second program instructions further comprise program instructions that are executable by the at least one second processor such that the second computing device is configured to:
  receive the first audio signal from the mixer device; and
  transmit the first audio signal; to the first computing device.

17. A method carried out by a first computing device of a computing system, the method comprising:
  coordinating with a second computing device of the computing system to produce one or more audio signals in synchrony, thereby producing a first audio signal;
  receiving, via a first input of an audio input interface of, the first audio signal;
  receiving, via a second input of the audio input interface, a second audio signal transmitted from the second computing device;
  decoding the first audio signal with a lossy audio decoder;
  storing at least a portion of the first audio signal in a first buffer;

downsampling the stored first audio signal to produce a downsampled audio signal;

applying a filter to the second audio signal to remove a range of audible frequencies of the second audio signal and thereby produce a filtered second audio signal;

storing at least a portion of the filtered second audio signal in a second buffer;

determining a cross-correlation between the downsampled audio signal and the filtered second audio signal;

based on the cross-correlation, determining an audio delay that is associated with the second audio signal; and after determining the audio delay, outputting at least a representation of the determined audio delay.

18. The method of claim 17, further comprising:

applying, to the portion of the first audio signal stored in the first buffer, a time delay that is equal to the determined audio delay; and playing back, via an audio output interface, the portion of the first audio signal stored in the first buffer according to the applied time delay.

19. The method of claim 17, further comprising:

determining the first audio signal based on a first clock of the first computing device that is synchronized with a second clock of the second computing device; and based on the first clock, playing back, in synchrony with the second computing device, at least one media item from an audio queue, wherein the first audio signal is received from the playback of the at least one media item.

20. The method of claim 17, wherein the audio delay comprises a second delay, the method further comprising:

determining a first delay associated with the first audio signal;

storing the first delay;

storing the second delay;

determining a difference between the first delay and the second delay; and outputting a representation of the difference between the first delay and the second delay.

21. At least one non-transitory computer-readable storage medium having program instructions stored thereon that are executable by at least one processor such that a computing system is configured to:

receive a first audio signal;

encode the first audio signal using an audio codec that results in an encoding latency that is less than a latency threshold;

encapsulate the encoded first audio signal in one or more datagrams;

transmit the one or more datagrams from a second computing device to a first computing device, wherein the second computing device is configured to coordinate with the first computing device to produce one or more audio signals in synchrony, thereby producing a first audio signal;

receive, via a first input of the first computing device, the encoded first audio signal;

store at least a portion of the first audio signal in a first buffer of the first computing device;

after receiving the first audio signal, receive, via a second input of the first computing device, a second audio signal transmitted from the second computing device;

store at least a portion of the second audio signal in a second buffer of the first computing device;

based on the portion of the first audio signal stored in the first buffer and the portion of the second audio signal stored in the second buffer, determine an audio delay that is associated with the second audio signal relative to the first audio signal; and after determining the audio delay, output at least a representation of the determined audio delay.

22. The at least one non-transitory computer-readable storage medium of claim 21, further comprising program instructions that are executable by the at least one processor to cause the computing system to:

prior to encoding the first audio signal, removing from the first audio signal a portion of an audible frequency spectrum.

23. The at least one non-transitory computer-readable storage medium of claim 21, further comprising program instructions that are executable by the at least one processor to cause the computing system to:

determine that the first computing device is out of range of the second computing device; and responsive to the determination that the first computing device is out of range of the second computing device, stop transmitting the one or more datagrams to the first computing device.

24. The at least one non-transitory computer-readable storage medium of claim 23, wherein the program instructions that are executable by the at least one processor to cause the computing system to determine that the first computing device is out of range of the second computing device comprise program instructions that are executable by the at least one processor to cause the computing system to:

determine that the second computing device has not received an acknowledgement signal from the first computing device in at least a threshold amount of time.

25. The at least one non-transitory computer-readable storage medium of claim 23, wherein the program instructions that are executable by the at least one processor to cause the computing system to determine that the first computing device is out of range of the second computing device comprise program instructions that are executable by the at least one processor to cause the computing system to:

receive from the first computing device an indication that the delay between the first audio signal and the second audio signal is greater than a threshold amount of delay.

* * * * *